Patented May 14, 1940

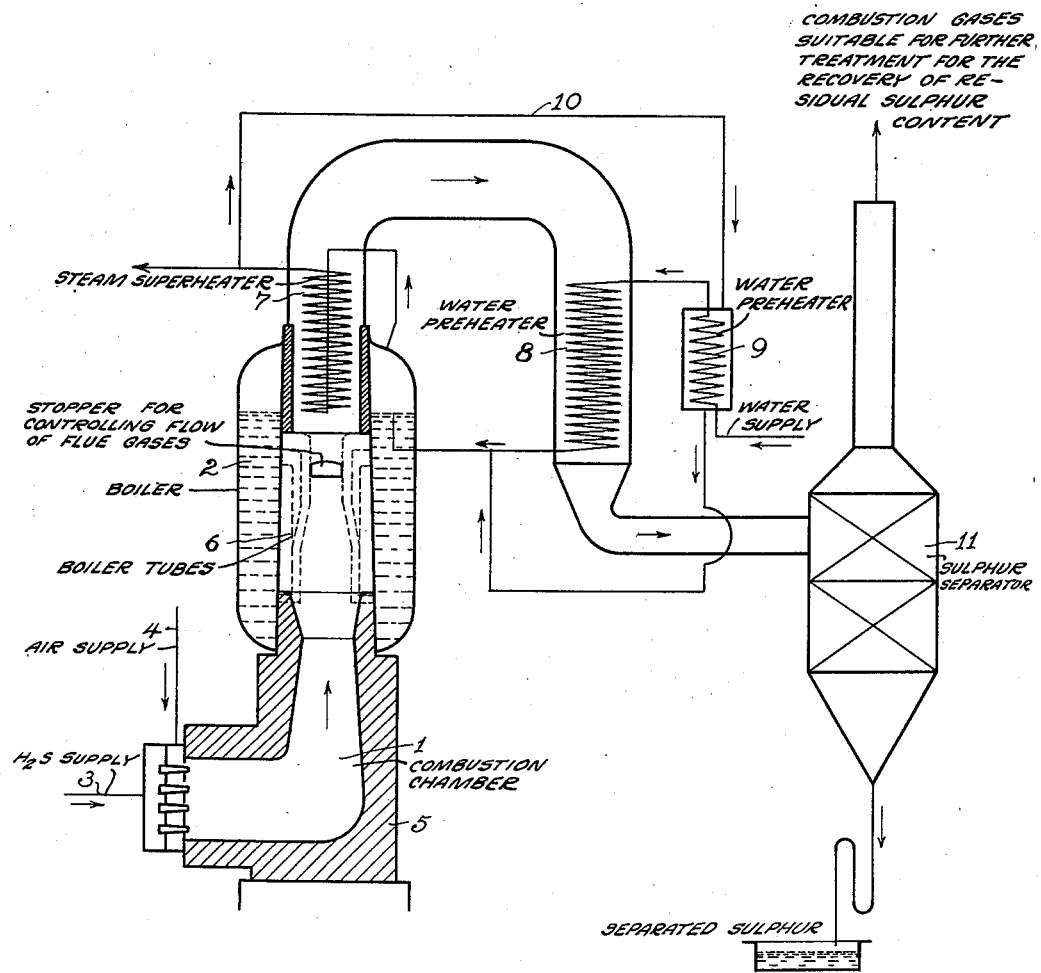

2,200,529

UNITED STATES PATENT OFFICE 2,200,529

PRODUCTION OF SULPHUR

Hans Baehr and Karl Braus, Leuna, Germany, assignors to I. G. Farbenindustrie Aktiengesellschaft, Frankfort-on-the-Main, Germany Application June 10, 1937, Serial No. 147,412
In Germany June 13, 1936

4 Claims. (Cl. 23—226)

The present invention relates to the production of sulphur from hydrogen sulphide or gases rich in hydrogen sulphide.

Attempts have already been made to obtain sulphur from hydrogen sulphide or gases rich in hydrogen sulphide by combustion with a free flame with the aid of as much oxygen or gases containing oxygen as is necessary for the conversion of the hydrogen sulphide into sulphur. Such attempts have hitherto been unsuccessful, however, because the combustion of hydrogen sulphide does not proceed uniformly, so that at times sulphur is obtained while at other times no conversion of the hydrogen sulphide takes place. Combustion with a free flame has therefore been abandoned for the purpose of producing sulphur from hydrogen sulphide and the conversion has been carried out according to the proposals of Claus by a catalytic method instead. This method of working has the great drawback, however, that the permissible loading of the catalyst, i. e. the amount of gas which can be treated by a given amount of catalyst per unit of time, is extremely small as compared with other catalytic reactions. By reason of the necessity for maintaining relatively low temperatures, only about 4 cubic meters of hydrogen sulphide can be converted per hour per cubic meter of catalyst. The process therefore requires extremely bulky apparatus which not only occasion high erection costs but which also require a large amount of space.

We have now found that the conversion of hydrogen sulphide or gases containing hydrogen sulphide into sulphur by combustion in a free flame with an amount of oxygen or gases containing elementary oxygen which is smaller than that required for the conversion of the hydrogen sulphide into sulphur dioxide can be carried out in a simple manner by maintaining at a place of the flame zone, i. e. within the flame or at a place in its direct neighbourhood, so high a temperature that the flame is continuously maintained and any extinguishing of the flame is avoided. This may be effected in a simple manner for example by arranging suitable heating bodies in the flame zone, the said heating bodies being heated to the necessary temperature for example by electrical means. It is, however, even more simple to carry out the combustion in a closed chamber the walls of which have been brought to the necessary temperature before the beginning of the conversion. The said walls may be externally protected against heat losses by suitable insulation. It is even more simple to line the walls of the combustion chamber with refractory bricks which, once they have been brought to the necessary temperature, are kept at the said temperature by the heat formed during the reaction. As a rule, the technically available apparatus for burning combustible gases, as for example the fire-boxes of boilers, may be used for the process without further alteration. Such apparatus usually accumulate sufficient heat to maintain the aforesaid conditions.

The minimum temperature necessary depends on the one hand on the hydrogen sulphide content of the gases, which should as a rule be at least 10 per cent and preferably at least 15 per cent, and on the other hand on the amount of oxygen present during the combustion. The temperature may be lower the higher the concentration of the hydrogen sulphide in the gas containing hydrogen sulphide to be burned on the one hand and the larger the amount of oxygen or gas containing elementary oxygen supplied for the conversion on the other hand. For example when working with practically pure hydrogen sulphide and effecting the combustion with such an amount of air that the amount of free oxygen is just sufficient for the conversion of the hydrogen sulphide into sulphur, it is usually sufficient for the heated or heat-accumulating place within the flame or in its neighbourhood to have a temperature of about 250° C. If it is desired to burn gases lower in hydrogen sulphide, as for example those containing 20 per cent of hydrogen sulphide, a temperature of at least about 700° C. must be maintained in the heated or heat-accumulating place. As a rule it is sufficient to use temperatures of about dark red heat, for example from about 500° to 600° C. When working with the said gases in a combustion chamber which is lined with refractory bricks, a temperature of from about 800° to 1000° C. is usually set up in the same.

The hydrogen sulphide may also be introduced into the combustion chamber in two or more stages so that at first a part of the hydrogen sulphide reacts with the whole amount of oxygen necessary for the conversion, whereby a high temperature may readily be maintained. Following on this combustion, the remainder of the hydrogen sulphide may be supplied.

When employing for the conversion just the amount of oxygen necessary for the conversion of the whole of the hydrogen sulphide into sulphur, there are present in the combustion gases after cooling from about 80 to 90 per cent of the hydrogen sulphide used in the form of sulphur.

This result is the more surprising because the combustion temperature for example in the case of 60 per cent hydrogen sulphide and the amount of air equivalent for conversion into sulphur is about 1000° C. and the equilibrium between hydrogen sulphide, sulphur dioxide and sulphur is known to be favourable for the formation of sulphur at low temperatures only, so that for example in the catalytic conversion without a free flame in a Claus furnace with a catalyst temperature of 500° C. only about 50 per cent of the hydrogen sulphide, and at higher temperatures even less thereof, is converted into sulphur.

The combustion of the hydrogen sulphide according to this invention is preferably effected beneath a steam boiler, whereby the heat developed during the combustion is utilized for the production of steam in the boiler and for the superheating of the steam and if necessary also for the preheating of the water supplied to the boiler.

Since sulphur solidifies at 114° or 119° C., an operating pressure for the steam boiler is used such that the boiling temperature of the water lies above 119° C., i. e. a pressure of at least 2 atmospheres. When using fire-tube boilers, the cooling of the combustion gases can be most simply effected without the aid of the preheater for the supply water, i. e. merely in the fire-tubes. It is also advantageous to have regard to the property of sulphur of being very mobile up to 150° C. Therefore, when there are no other reasons for selecting higher or lower operating pressures of the boiler, there is selected for example a fire-tube boiler for the production of steam at about 4 atmospheres, whereby the sulphur by condensation on the fire-tubes separates in a very mobile form and therefore runs away especially readily.

When using preheaters for the supply water for the cooling of the combustion gases, care must be taken that the supply water enters the preheater at a temperature of at least 119° C. because otherwise the sulphur would solidify on the preheater tubes. For example the supply water may be first heated in a preheater arranged outside the boiler with a small part of the steam produced in the boiler, for example to 120° C., the supply water thus heated then being led, together with the condensed steam, into the preheater heated by the combustion gases. It is advantageous to arrange the single parts of the boiler so that the sulphur separated in the liquid state by the cooling of the combustion gases can flow away from the boiler parts in the direction of the stream of gas.

The fire-box of the boiler is internally lined with several layers of fire-brick so that the iron outer shell of the fire-box does not attain temperatures substantially above 100° C. Contrary to expectation, no sulphurization or corrosion of the metal parts of the boiler takes place in spite of the high concentration of the vaporous sulphur in the combustion gases and in spite of the separation of the liquid sulphur on the metal parts of the boiler, provided temperatures of between 330° to 350° C. are not exceeded. If that condition cannot be maintained, it is preferable to protect the metallic parts by a zinc coating which may be applied by dipping the material in a hot bath of liquid zinc or also by exposing the metallic parts to an atmosphere of zinc vapor at high temperatures. It should be noted, however, that the metallic parts of the boiler should not have a temperature far below 100° C. because otherwise the dew point of the combustion gases may be reached and acid condensates having a corrosive action may be formed.

In order to separate the sulphur still present in the combustion gases after leaving the boiler, the gases must be cooled to at least about 200° C., advantageously to a still lower temperature. If possible, the gases are cooled to a temperature in the neighborhood of 120° C., since only at such comparatively low temperatures the vapor tension of sulphur is sufficiently low to render possible a complete separation of the sulphur.

The cooled gases may be led in known manner for example through electro-filters or so-called "multiclones" (which consist of a plurality of cyclones arranged in parallel and enclosed in a common housing) or through separators filled with Raschig rings or through similar devices in which the sulphur separates.

Instead of cooling the combustion gases in a steam boiler, they may be cooled for example with air or oil coolers or the gases may be cooled by spraying in water, in which case it is preferable to use water under pressure which is heated to above 100° C.

If the amount of hydrogen sulphide to be converted into sulphur varies, provision is made for the continuous maintenance of the requisite amount of oxygen or gases containing oxygen by means of control apparatus of known construction. When gases containing varying amounts of hydrogen sulphide are treated, it is preferable to use automatic analysis apparatus which at the same time control the amount of oxygen or gases containing oxygen supplied to the combustion chamber.

When it is sufficient to convert from about 80 to 90 per cent of the hydrogen sulphide into sulphur, the combustion gases, after the separation of the sulphur, may if desired be led through sulphur dust chambers and then into a chimney or for example into an ordinary boiler firing.

If, on the other hand, it is desired to convert the hydrogen sulphide as completely as possible into sulphur, the combustion gases, after cooling and if desired after separation of sulphur, are led in known manner over catalysts for the conversion of the hydrogen sulphide still present. In this case, in contrast to the usual Claus process, the catalyst may be loaded about 100 times more strongly by reason of the only slight heat of reaction, which usually occasions a rise in temperature of only about 50° C. Before entry to the catalyst the combustion gases are cooled no further than to the lower reaction limit of the catalyst. It is also preferable, when the combustion gases are strongly cooled before entry to the catalyst, to provide for as complete a separation of the sulphur already formed as possible, because it would otherwise be precipitated in the first layers of catalyst and might give rise to stoppages therein.

If such a far-reaching separation of the sulphur already formed is dispensed with, the working temperature in the layer of catalyst must be correspondingly higher; for example the gases may be introduced into the catalyst at a temperature of 220° C. If a boiler is used, the catalyst may be arranged at any place outside or inside the boiler. For example it may be arranged in the boiler outlet or even in the fire-tubes of the boiler. Frequently it is preferable to subdivide the catalyst into two layers and to provide a gas cooling and simple separation of sulphur between the two layers. Since the reaction when influenced by catalysts proceeds more completely the lower the reaction temperature is, the subdivision of the catalyst layer with an intermediate cooling and separation of sulphur facilitates the complete conversion of the hydrogen sulphide into sulphur.

In case it is desired to convert part of the hydrogen sulphide into sulphur and the remainder into sulphur dioxide, the combustion may be carried through with so much oxygen or gases containing oxygen that the percentage of the hydrogen sulphide which is not to be converted into sulphur is directly burnt to sulphur dioxide. For example, if one third of the hydrogen sulphide is to be converted into sulphur and the other two thirds into sulphur dioxide, the hydrogen sulphide is burnt with 5.6 times its amount of air. Combustion gases are then obtained in a single operation which contain one third of the hydrogen sulphide in the form of sulphur and two thirds in the form of sulphur dioxide. When the sulphur has been separated from these gases, sulphur dioxide is left. This method has the advantage that the sulphur dioxide is free from sulphur trioxide so that the risk of corrosion is reduced.

The process according to this invention is capable of being adapted to a great extent to the requirements in any single case. For example if it is desired to obtain from the hydrogen sulphide, not only sulphur but also sulphuric acid, the hydrogen sulphide is burned with an amount of air or oxygen such as is necessary for the formation of the desired amount of sulphur. The combustion gases are then cooled and the sulphur formed separated. The residual gas is then burned with an excess of oxygen or oxygen-containing gas, if desired with the aid of catalysts, to form sulphur dioxide which may then be converted into sulphuric acid in known manner.

If, in addition to hydrogen sulphide, there is also available sulphur dioxide or gases containing the same, the latter may also be rendered useful for the production of sulphur by supplying sulphur dioxide to the gases containing hydrogen sulphide before or during the combustion in a free flame. The amount of oxygen or oxygen-containing gas may then be correspondingly smaller but must, however, always be sufficiently great that the combustion with the free flame proceeds without trouble. In the same way sulphur trioxide or even sulphuric acid may be supplied instead of sulphur dioxide and also converted into sulphur.

The following examples will further illustrate the nature of this invention, of which Example 1 is given with reference to the accompanying drawing which shows diagrammatically a vertical section of an arrangement of apparatus suitable for carrying out the process according to this invention; but the invention is restricted neither to these examples nor to the particular arrangement shown.

Example 1

1500 cubic meters of a gas containing 60 per cent of hydrogen sulphide and 40 per cent of carbon dioxide are burned per hour with 2160 cubic meters of air in the combustion chamber 1 of a vertical fire-box boiler 2 for the production of steam at a pressure of 16 atmospheres. The gas containing hydrogen sulphide is supplied through a pipe 3 and the air through a pipe 4. The combustion chamber of the boiler is lined with refractory bricks 5 and is brought, before the beginning of the reaction, to the necessary temperature, i. e. at least to dark red heat, either by burning a heating gas or by burning the gas containing hydrogen sulphide with an excess of air. Within the boiler in the path of the combustion gases above the boiler tubes 6 (shown in broken lines) there are arranged a steam superheater 7 and a supply water preheater 8 through which the combustion gases pass downwards. Into the preheater 8 there is led supply water which has previously been heated to at least 120 C. in a special preheater 9, arranged outside the boiler, with the aid of steam supplied through a pipe 10.

The combustion gases, which contain an amount of vaporous sulphur corresponding to about 85 per cent of the hydrogen sulphide introduced into the combustion chamber and also 3 per cent of hydrogen sulphide and 1.5 per cent of sulphur dioxide, are led to the supply water preheater 8 after passage through the steam superheater 7. The amount of water supplied to the supply water preheater 8 and its temperature are so regulated that the combustion gases are cooled to 180° C. therein. In this way half of the sulphur contained in the gases is separated in liquid form. The gases are then led at the same temperature through a so-called "multicione" 11 for the recovery of the remaining sulphur. There are obtained per hour 1020 kilograms of liquid sulphur in all and also 2.1 metric tons of superheated steam under a pressure of 16 atmospheres. The combustion gases are then led through so-called dust chambers (not shown) in which the greater part of the hydrogen sulphide and sulphur dioxide still contained therein are converted into sulphur and are then led to a chimney.

Example 2

For converting practically pure hydrogen sulphide in an amount of 500 cubic meters per hour practically completely into sulphur the gas is burnt with 1200 cubic meters of air per hour in the fire-box of a horizontal fire-tube boiler which is downwardly inclined in the direction of the flow of the gases. The fire-box of the boiler is internally lined with so many layers of fire-brick that the iron shell of the fire-box does not become substantially hotter than 100° C. In the boiler, steam of 4 atmospheres pressure is produced.

The boiler is provided not only with the usual comparatively narrow fire-tubes, but also with a comparatively wide tube which may be closed or opened at will by means of a conical stopper at the gas exit side. When the stopper is closed, the gases must pass exclusively through the narrow fire-tubes and are then cooled comparatively strongly by the water surrounding the fire tubes. If, however, the stopper in the wide tube is opened, a large amount of gas will pass through the wide tube and will be cooled therein to a comparatively small extent so that in that case the temperature of the gases leaving the boiler is correspondingly higher. Therefore, by suitably controlling the position of the stopper in the wide tube, the temperature of the gases leaving the boiler may be so controlled that it is about 250° C. The gases are then introduced by means of an isolated pipe into a layer of bauxite catalyst amounting to about 3 cubic meters. In this catalyst, the temperature of the gases is increased by about 100° C., i. e. to about 350° C. The gases then pass through a separating chamber of about 6 cubic meter capacity arranged below the catalyst in which the gases are cooled to about 180° C. The gases are then heated to about 250° C. by the combustion heat supplied by burning a small amount of hydrogen sulphide with 2.4 times its amount of air and are then introduced into a second bauxite catalyst of about 3 cubic meters similar to the first one. The gases leaving this second catalyst pass through an electrostatic filter which they leave with a temperature of about 130° C.

During the combustion in the boiler, about 80 per cent of the hydrogen sulphide is converted into sulphur. The gases contain, in addition to nitrogen and water vapor, hydrogen sulphide and sulphur dioxide in the proportion of 2:1. These latter constituents are converted in the first catalyst layer so far that the total yield in sulphur amounts to 90 per cent and in the second catalyst layer so far that the total yield is 95 per cent. Of the sulphur formed, about one fifth is separated in the liquid state in the boiler, about three fifths below the two catalysts, and the last fifth in the electro-filter. The liquid sulphur may be withdrawn from each place into a common collecting vessel.

If the combustion of the hydrogen sulphide in the boiler would be omitted, the cataylsts would be able to convert only about 12 cubic meters of hydrogen sulphide per hour into sulphur and the yield would only be 85 per cent.

What we claim is:

1. The process of producing sulphur which comprises burning a gas comprising a substantial amount of hydrogen sulphide in a free flame with an amount of a gas comprising elementary oxygen which is smaller than that required for the conversion of all of the hydrogen sulphide into sulphur dioxide but is sufficient to convert the hydrogen sulphide to free sulphur, maintaining at a place of the flame zone so high a temperature that the flame is continuously maintained, cooling the resulting gas, separating sulphur therefrom and passing the remaining gas over a catalyst for converting the remainder of the hydrogen sulphide into sulphur in accordance with the Claus process.

2. The process of producing sulphur which comprises burning a gas comprising a substantial amount of hydrogen sulphide in a free flame with an amount of a gas comprising elementary oxygen which is smaller than that required for the conversion of all of the hydrogen sulphide into sulphur dioxide but is sufficient to convert the hydrogen sulphide to free sulphur, maintaining at a place of the flame zone so high a temperature that the flame is continuously maintained, cooling the resulting gas and passing it over a catalyst for converting the remainder of the hydrogen sulphide into sulphur in accordance with the Claus process.

3. The process of producing sulphur which comprises burning in the presence of sulphur dioxide a gas comprising a substantial amount of hydrogen sulphide in a free flame with an amount of a gas comprising elementary oxygen which is smaller than that required for the conversion of all of the hydrogen sulphide into sulphur dioxide but is sufficient to convert the hydrogen sulphide to free sulphur, maintaining at a place of the flame zone so high a temperature that the flame is continuously maintained, cooling the resulting gas and passing it over a catalyst for converting the remainder of the hydrogen sulphide into sulphur in accordance with the Claus process.

4. The process of producing sulphur which comprises burning a gas comprising a substantial amount of hydrogen sulphide in a free flame with an amount of a gas comprising elementary oxygen which is smaller than that required for the conversion of all of the hydrogen sulphide into sulphur dioxide but is sufficient to convert the hydrogen sulphide to free sulphur, maintaining at a place of the flame zone so high a temperature that the flame is continuously maintained, transferring heat from the resulting combustion gases to a body of water, thereby producing steam and simultaneously cooling the combustion gas, and passing said combustion gas over a catalyst for converting the remainder of the hydrogen sulphide into sulphur in accordance with the Claus process.

HANS BAEHR.
KARL BRAUS.